(12) United States Patent
Oku et al.

(10) Patent No.: US 10,639,871 B2
(45) Date of Patent: May 5, 2020

(54) LAMINATE FILM AND PACKAGING BAG USING SAME

(71) Applicant: MITSUI CHEMICALS, INC., Minato-ku, Tokyo (JP)

(72) Inventors: Tatsuya Oku, Ichihara (JP); Tomohiro Abe, Chiba (JP); Satoshi Ikeda, Chiba (JP); Kiminori Noda, Mobara (JP); Makoto Egawa, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 402 days.

(21) Appl. No.: 15/504,943

(22) PCT Filed: Aug. 21, 2015

(86) PCT No.: PCT/JP2015/073509
§ 371 (c)(1),
(2) Date: Feb. 17, 2017

(87) PCT Pub. No.: WO2016/027885
PCT Pub. Date: Feb. 25, 2016

(65) Prior Publication Data
US 2017/0266934 A1 Sep. 21, 2017

(30) Foreign Application Priority Data

Aug. 22, 2014 (JP) ................. 2014-169835

(51) Int. Cl.
| | |
|---|---|
| *B32B 27/32* | (2006.01) |
| *B29C 48/00* | (2019.01) |
| *B29C 48/21* | (2019.01) |
| *B29C 55/12* | (2006.01) |
| *B65D 65/40* | (2006.01) |
| *C08F 210/02* | (2006.01) |
| *B32B 27/00* | (2006.01) |
| *C09J 7/29* | (2018.01) |
| *B29C 55/00* | (2006.01) |
| *B29C 71/04* | (2006.01) |
| *B29K 23/00* | (2006.01) |

(Continued)

(52) U.S. Cl.
CPC .......... *B32B 27/32* (2013.01); *B29C 48/0018* (2019.02); *B29C 48/022* (2019.02); *B29C 48/21* (2019.02); *B29C 55/005* (2013.01); *B29C 55/12* (2013.01); *B29C 71/04* (2013.01); *B32B 27/00* (2013.01); *B65D 65/40* (2013.01); *C08F 210/02* (2013.01); *C09J 7/29* (2018.01); *B29K 2023/10* (2013.01); *B29L 2009/00* (2013.01); *B29L 2031/7129* (2013.01); *B32B 2307/518* (2013.01); *B32B 2439/06* (2013.01); *C09J 2201/61* (2013.01); *C09J 2205/114* (2013.01); *C09J 2409/00* (2013.01); *C09J 2423/04* (2013.01); *C09J 2423/10* (2013.01)

(58) Field of Classification Search
CPC ..... B32B 27/00; B32B 27/32; B29C 48/0018; B29C 48/022; B29C 48/21; B29C 55/005; B29C 55/12; B29C 71/04; B65D 65/40
See application file for complete search history.

(56) References Cited

U.S. PATENT DOCUMENTS

| | | |
|---|---|---|
| 7,014,920 B2 | 3/2006 | Kuriu |
| 7,192,636 B2 | 3/2007 | Taghavi |
| (Continued) | | |

FOREIGN PATENT DOCUMENTS

| | | |
|---|---|---|
| EP | 2 222 730 B1 | 6/2012 |
| JP | H05-069521 A | 3/1993 |
| (Continued) | | |

OTHER PUBLICATIONS

International Search Report issued in International Patent Application No. PCT/JP2015/073509 dated Nov. 24, 2015.

(Continued)

*Primary Examiner* — Edward J Cain
(74) *Attorney, Agent, or Firm* — Foley & Lardner LLP

(57) ABSTRACT

A laminate film (30) of the present invention includes a heat sealing layer (10) composed of a resin composition including, with respect to 20 to 95 parts by weight of a propylene-based polymer (A) having a melting point (Tm) of equal to or higher than 120° C. and equal to or lower than 170° C. as measured by differential scanning calorimetry (DSC), a total of 5 to 80 parts by weight of two or more kinds of copolymers selected from the group consisting of a propylene.1-butene copolymer (B) containing a unit derived from propylene in an amount of 51 to 95 mol % and a unit derived from 1-butene in an amount of 5 to 49 mol %, wherein the total of the unit derived from propylene and the unit derived from 1-butene is 100 mol %, a copolymer (C) of ethylene and an α-olefin having 3 to 20 carbon atoms, and a copolymer (D) of 1-butene and an α-olefin having 3 carbon atoms or 5 to 20 carbon atoms containing a constitutional unit derived from 1-butene in an amount of 50 to 99 mol % and a constitutional unit derived from an α-olefin having 3 carbon atoms or 5 to 20 carbon atoms in an amount of 1 to 50 mol %, wherein the total of the unit derived from 1-butene and the unit derived from the α-olefin is 100 mol %, wherein each of Component (B), Component (C), and Component (D) does not correspond to Component (A), and the total amount of Component (A), Component (B), Component (C), and Component (D) is 100 parts by weight, and a base layer (20), in which a surface of the heat sealing layer (10) opposite to the base layer (20) has a wet tension of 32 to 45 mN/m.

9 Claims, 1 Drawing Sheet

(51) Int. Cl.
    *B29L 9/00*           (2006.01)
    *B29L 31/00*         (2006.01)

(56)           References Cited

U.S. PATENT DOCUMENTS

| | | |
|---|---|---|
| 7,879,439 B2 | 2/2011 | Kawai et al. |
| 8,354,171 B2 | 1/2013 | Manabe et al. |
| 2003/0049471 A1 | 3/2003 | Kuriu |
| 2008/0003386 A1 | 1/2008 | Kawai et al. |

FOREIGN PATENT DOCUMENTS

| | | |
|---|---|---|
| JP | H07-052334 A | 2/1995 |
| JP | 2003-182007 A | 7/2003 |
| JP | 2005-307112 A | 11/2005 |
| JP | 2009-241975 A | 10/2009 |
| JP | 2011-173658 A | 9/2011 |
| WO | WO-01/78980 A1 | 10/2001 |
| WO | WO-2008/017244 A1 | 2/2008 |
| WO | WO-2013/180710 A1 | 12/2013 |

OTHER PUBLICATIONS

Indian office Action dated Apr. 26, 2019 in corresponding application No. 201717006294.

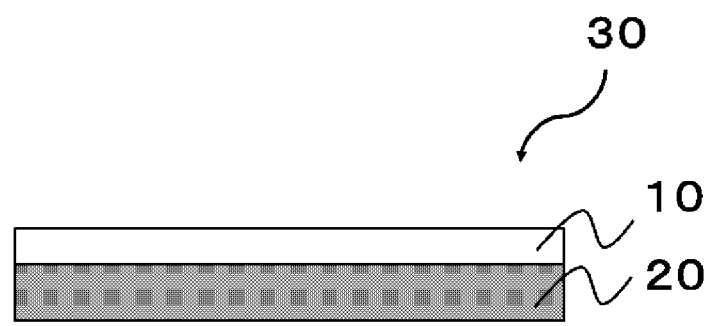

LAMINATE FILM AND PACKAGING BAG USING SAME

TECHNICAL FIELD

The present invention relates to a laminate film and a packaging bag using the same.

BACKGROUND ART

In general, in a film for packaging various hydrous foods typified by meat, processed meat foods such as sausage, fresh vegetables and seafood, and other processed foods, food is hardly visible due to fogging caused by water vapor that is vaporized from the food, adheres to and condenses on the inner surface of the film. Thus, the film is required to have antifogging properties to prevent fogging.

In order to exhibit antifogging properties, there are proposed methods for imparting antifogging properties by adding a surfactant to a film of the innermost surface layer as an antifogging agent to improve wettability of the surface (for example, Patent Documents 1 to 3). However, in this method, when a large amount of surfactant is used, there is a concern of bleed-out occurring over the surface of the film.

Another known method for imparting antifogging properties is a method of imparting wettability by performing a corona treatment on the surface of a film. However, in the case of performing a corona treatment, the strength of a heat-sealed portion may be decreased by the treatment. In order to prevent the strength from being decreased, for example, a method of selectively performing a corona treatment on only portions other than the sealed portion is proposed (for example, Patent Document 4). However, the method of performing a corona treatment on only a specific region of the surface of the film has complicated the operations and the number of steps increases. Thus, there has been a demand for establishing an industrially advantageous method.

RELATED DOCUMENT

Patent Document

[Patent Document 1] Japanese Laid-open Patent Publication No. H05-69521

[Patent Document 2] Japanese Laid-open Patent Publication No. H07-52334

[Patent Document 3] Pamphlet of International Publication WO. 2001/78980

[Patent Document 4] Japanese Laid-open Patent Publication No. 2009-241975

SUMMARY OF THE INVENTION

The present invention has been made in consideration of the above circumstances, and an object thereof is to provide a packaging bag in which water drops immediately spread not to cause fogging due to high wettability even in a case in which a content having a high water content is sealed with the packaging bag, that is, a laminate film for a packaging bag excellent in antifogging properties, and exhibiting sufficient strength even in a case of adopting a known heat sealing temperature during heat sealing, and a packaging bag obtained from the film. The concept is also applied to, for example, a packaging bag which is subjected to a corona treatment for improving printability.

That is, the present invention can adopt the following constitutions.

[1] A laminate film including: a heat sealing layer composed of a resin composition including, with respect to 20 to 95 parts by weight of a propylene-based polymer (A) having a melting point (Tm) of equal to or higher than 120° C. and equal to or lower than 170° C. as measured by differential scanning calorimetry (DSC), a total of 5 to 80 parts by weight of two or more kinds of copolymers selected from the group consisting of a propylene.1-butene copolymer (B) containing a unit derived from propylene in an amount of 51 to 95 mol % and a unit derived from 1-butene in an amount of 5 to 49 mol %, wherein the total of the unit derived from propylene and the unit derived from 1-butene is 100 mol %, a copolymer (C) of ethylene and an $\alpha$-olefin having 3 to 20 carbon atoms, and a copolymer (D) of 1-butene and an $\alpha$-olefin having 3 carbon atoms or 5 to 20 carbon atoms containing a constitutional unit derived from 1-butene in an amount of 50 to 99 mol % and a constitutional unit derived from an $\alpha$-olefin having 3 carbon atoms or 5 to 20 carbon atoms in an amount of 1 to 50 mol %, wherein the total of the unit derived from 1-butene and the unit derived from the $\alpha$-olefin is 100 mol %, wherein each of Component (B), Component (C), and Component (D) does not correspond to Component (A), and the total amount of Component (A), Component (B), Component (C), and Component (D) is 100 parts by weight; and a base layer, in which a surface of the heat sealing layer opposite to the base layer has a wet tension of 32 to 45 mN/m.

[2] The laminate film according to [1], in which the surface of the heat sealing layer is modified by a corona treatment.

[3] The laminate film according to [1] or [2], in which two or more kinds of copolymers selected from the group consisting of the Component (B), the Component (C), and the Component (D) include the Component (B) as a required component, and the content of the Component (B) is 3 to 25 parts by weight [wherein the total amount of Component (A), Component (B), Component (C), and Component (D) is 100 parts by weight].

[4] The laminate film according to any one of [1] to [3], in which the copolymer (C) of ethylene and an $\alpha$-olefin having 3 to 20 carbon atoms contains a constitutional unit derived from ethylene in an amount of 50 to 99 mol % and a constitutional unit derived from an $\alpha$-olefin having 3 to 20 carbon atoms in an amount of 1 to 50 mol %, therein the total of the unit derived from ethylene and the unit derived from the $\alpha$-olefin is 100 mol %.

[5] The laminate film according to any one of [1] to [4] which is not stretched.

[6] The laminate film according to any one of [1] to [4] which is biaxially stretched.

[7] A packaging bag which is formed by fusing the heat sealing layers of the laminate films according to any one of [1] to [6].

[8] A laminate film including: a heat sealing layer composed of a resin composition including, with respect to 20 to 95 parts by weight of a propylene-based polymer (A) having a melting point (Tm) of equal to or higher than 120° C. and equal to or lower than 170° C. as measured by differential scanning calorimetry (DSC), a total of 5 to 80 parts by weight of two or more kinds of copolymers selected from the group consisting of a propylene.1-butene copolymer (B) containing a unit derived from propylene in an amount of 51 to 95 mol % and a unit derived from 1-butene in an amount of 5 to 49 mol %, wherein the total of the unit derived from propylene and the unit derived from 1-butene is 100 mol %, a copolymer (C) of ethylene and an α-olefin having 3 to 20 carbon atoms, and a copolymer (D) of 1-butene and an α-olefin having 3 carbon atoms or 5 to 20 carbon atoms containing a constitutional unit derived from 1-butene in an amount of 50 to 99 mol % and a constitutional unit derived from α-olefin having 3 carbon atoms or 5 to 20 carbon atoms in an amount of 1 to 50 mol %, wherein the total of the unit derived from 1-butene and the unit derived from the α-olefin is 100 mol %, wherein each of Component (B), Component (C), and Component (D) does not correspond to Component (A), and the total amount of Component (A), Component (B), Component (C), and Component (D) is 100 parts by weight; and a base layer, in which the heat sealing layer included in the laminate film is subjected to a modification treatment.

[9] The laminate film according to [8], in which the surface of the heat sealing layer opposite to the base layer has a wet tension of 5 to 30 mN/m.

The laminate film of the present invention includes a heat sealing layer formed of a resin composition composed of specific Components (A) to (D) and although the heat sealing layer is designed to have wet tension, for example, exhibiting an antifogging effect and printability by a corona treatment, the laminate film exhibits sufficient strength even in a case in which the heat sealing layer is sealed at a known heat sealing temperature. Therefore, it is possible to provide a packaging bag having antifogging properties and printability and excellent in heat sealing strength in a case of heat-fusing heat sealing layers.

BRIEF DESCRIPTION OF THE DRAWINGS

The above object, other objects, characteristics, and advantages will be further clarified using preferable embodiments described below and the following drawing attached to the embodiments.

FIG. 1 is a schematic cross-sectional view showing a laminate film according to an embodiment.

DESCRIPTION OF EMBODIMENTS

Hereinafter, the embodiments of the invention will be described in detail using an appropriate drawing. In addition, "A to B" in the present specification indicates "equal to or more than A and equal to or less than B" unless otherwise specified.

[Laminate Film]

A laminate film according to an embodiment includes a heat sealing layer composed of a resin composition including, with respect to 20 to 95 parts by weight of a propylene-based polymer (A) having a melting point (Tm) of equal to or higher than 120° C. and equal to or lower than 170° C. as measured by differential scanning calorimetry (DSC), a total of 5 to 80 parts by weight of two or more kinds of copolymers selected from the group consisting of a propylene.1-butene copolymer (B) containing a unit derived from propylene in an amount of 51 to 95 mol % and a unit derived from 1-butene in an amount of 5 to 49 mol %, wherein the total of the unit derived from propylene and the unit derived from 1-butene is 100 mol %, a copolymer (C) of ethylene and an α-olefin having 3 to 20 carbon atoms, and a copolymer (D) of 1-butene and an α-olefin having 3 carbon atoms or 5 to 20 carbon atoms containing a constitutional unit derived from 1-butene in an amount of 50 to 99 mol % and a constitutional unit derived from α-olefin having 3 carbon atoms or 5 to 20 carbon atoms in an amount of 1 to 50 mol %, wherein the total of the unit derived from 1-butene and the unit derived from the α-olefin is 100 mol %, wherein each of Component (B), Component (C), and Component (D) does not correspond to Component (A), and the total amount of Component (A), Component (B), Component (C), and Component (D) is 100 parts by weight, and a base layer, and the surface of the heat sealing layer opposite to the base layer has a wet tension of 32 to 45 mN/m.

Hereinafter, the laminate film according to the embodiment will be described while referring to FIG. 1.

A laminate film 30 shown in FIG. 1 includes a heat sealing layer 10 and a base layer 20. The heat sealing layer 10 constituting the laminate film 30 of the embodiment is formed by blending a propylene-based polymer (A) having a melting point (Tm) of equal to or higher than 120° C. and equal to or lower than 170° C. as measured by differential scanning calorimetry (DSC) (hereinafter, also referred to as "Component (A)") as a required component, and blending, in addition to Component (A), two or more kinds of copolymers selected from the group consisting of a propylene.1-butene copolymer (B) containing a unit derived from propylene in an amount of 51 to 95 mol % and a unit derived from 1-butene in an amount of 5 to 49 mol %, wherein the total of the unit derived from propylene and the unit derived from 1-butene is 100 mol % (hereinafter, also referred to as "Component (B)"), a copolymer (C) of ethylene and an α-olefin having 3 to 20 carbon atoms (hereinafter, also referred to as "Component (C)"), and a copolymer (D) of 1-butene and an α-olefin having 3 carbon atoms or 5 to 20 carbon atoms containing a constitutional unit derived from 1-butene in an amount of 50 to 99 mol % and a constitutional unit derived from an α-olefin having 3 carbon atoms or 5 to 20 carbon atoms in an amount of 1 to 50 mol %, wherein the total of the unit derived from 1-butene and the unit derived from the α-olefin is 100 mol % (hereinafter, also referred to as "Component (D)") at a specific ratio.

More specifically, an embodiment in which Component (B) and Component (C) are blended with respect to Component (A), an embodiment in which Component (B) and Component (D) are blended with respect to Component (A), an embodiment in which Component (C) and Component (D) are blended with respect to Component (A), and an embodiment in which Component (B), Component (C), and Component (D) are blended with respect to Component (A) are exemplified.

Among these embodiments, from the viewpoint of ease of blending of each component, an embodiment in which Component (B) and Component (C) are blended with respect to Component (A) and an embodiment in which Component (B) and Component (D) are blended with respect to Component (A) are preferable.

In the embodiment, the heat sealing layer surface of the laminate film 30, which is on the side close to the heat sealing layer 10 and is opposite to the base layer 20, has a wet tension of 32 to 45 mN/m.

The laminate film 30 of the embodiment may be an unstretched film or a stretched film according to the application of use. However, it is preferable to use a stretched film which is excellent in tensile strength, stiffness, or impact strength. Examples of the stretched film include monoaxially and biaxially stretched films.

In addition, from the viewpoint of improving heat resistance, tear strength, flexibility, and the like, an unstretched film may be used.

In the case in which the laminate film 30 of the embodiment is an unstretched film, the laminate film 30 can be prepared by, for example, using two extruders connected with a T-die, supplying the resin composition constituting the heat sealing layer 10 and the resin composition constituting the base layer 20 to the respective extruders, and molding the compositions by coextrusion.

In this case, the thickness of the entire laminate film 30 can be set to be within a range of, for example, 50 μm to 5,000 μm.

In addition, a ratio between the thickness of the heat sealing layer 10 and the thickness of the base layer 20 can be set to be within a range of, for example, 1:99 to 99:1.

The aforementioned thickness can be changed to be appropriate according to the application of use of the laminate film 30.

In the case in which the laminate film 30 of the embodiment is a stretched film, the laminate film 30 can be prepared by stretching the aforementioned unstretched film, for example, using a stretching machine.

In this case, the thickness of the entire laminate film 30 can be set to be within a range of, for example, 1 μm to 500 μm.

In the laminate film 30 of the embodiment, the heat sealing layer surface which is on the side close to the heat sealing layer 10 and is opposite to the base layer 20 has a wet tension of 32 to 45 mN/m. The heat sealing layer surface having a wet tension of 32 to 45 mN/m is obtained by, for example, subjecting a modification treatment on the heat sealing layer surface. The surface modification may be performed by a known treatment method and for example, a corona treatment, a plasma treatment, a flame treatment may be used. Particularly, since a specific environment is not required and the surface can be easily treated, a corona treatment is desirable. The wet tension can be controlled by adjusting the degree of surface modification.

By performing such a treatment, the wet tension of the surface of the heat sealing layer 10 can be improved. In the embodiment, the value of the wet tension is set to be within a range of 32 to 45 mN/m but within this range, the wet tension can be appropriately set according to the application of use of the laminate film 30, preferably set to 34 to 43 mN/m and more preferably set to 36 to 41 mN/m. By setting the wet tension to be within this range, sufficient antifogging properties can be exhibited when the film is formed into a packaging bag.

In the embodiment, the wet tension can be measured according to ASTM-D-2578-67T in an environment of 23° C. and 65% RH.

The conditions for performing the corona treatment can be appropriately set as long as it does not impair the object of the present invention, and as an example thereof, for example, the condition that a one-way corona treatment is performed using a moving table type corona treatment apparatus, manufactured by Kasuga electric works Ltd., or the like can be selected.

The rate of the treatment for the film in this case is, for example, 5 cm/sec to 20 cm/sec (3 m/min to 12 m/min). In addition, the condition for discharge output is set to be within a range of, for example, 1 A to 5 A.

In the case in which the laminate films 30 of the embodiment are superposed in such a manner that, for example, the heat sealing layers 10 are superposed with each other and heat sealing is performed at a temperature of 120° C. at the upper portion of a heat seal bar by the method described in (Measurement of Heat Sealing Strength) in [Example 1], which will be described later, the heat sealing strength can be set to be equal to or more than 2.0 N/mm, preferably set to be equal to or more than 2.5 N/mm, and more preferably set to be equal to or more than 3.0 N/mm.

In the embodiment, the laminate film shown below is also important to solve the problems of the present application.

A laminate film including: a heat sealing layer composed of a resin composition including, with respect to 20 to 95 parts by weight of a propylene-based polymer (A) having a melting point (Tm) of equal to or higher than 120° C. and equal to or lower than 170° C. as measured by differential scanning calorimetry (DSC), a total of 5 to 80 parts by weight of two or more kinds of copolymers selected from the group consisting of a propylene.1-butene copolymer (B) containing a unit derived from propylene in an amount of 51 to 95 mol % and a unit derived from 1-butene in an amount of 5 to 49 mol %, wherein the total of the unit derived from propylene and the unit derived from 1-butene is 100 mol %, a copolymer (C) of ethylene and an α-olefin having 3 to 20 carbon atoms, and a copolymer (D) of 1-butene and an α-olefin having 3 carbon atoms or 5 to 20 carbon atoms containing a constitutional unit derived from 1-butene in an amount of 50 to 99 mol % and a constitutional unit derived from an α-olefin having 3 carbon atoms or 5 to 20 carbon atoms in an amount of 1 to 50 mol %, wherein the total of the unit derived from 1-butene and the unit derived from the α-olefin is 100 mol %, wherein each of Component (B), Component (C), and Component (D) does not correspond to Component (A), and the total amount of Component (A), Component (B), Component (C), and Component (D) is 100 parts by weight]; and a base layer, in which the heat sealing layer included in the laminate film is subjected to a modification treatment.

That is, in the aforementioned laminate film, a specific wet tension can be achieved by performing a modification treatment to the heat sealing layer.

In a laminate film which is not subjected to the modification treatment, for example, the wet tension of the surface of the heat sealing layer which is opposite to the base layer is set to be within a range of 5 to 30 mN/m and more preferably set to be within a range of 10 to 30 mN/m.

Subsequently, the heat sealing layer 10 and the base layer 20 constituting the laminate film 30 will be described.

[Heat Sealing Layer]

The heat sealing layer 10 of the embodiment is formed by blending the following four components at an appropriate ratio:

a propylene-based polymer (A) having a melting point (Tm) of equal to or higher than 120° C. and equal to or lower than 170° C. as measured by differential scanning calorimetry (DSC) (Component (A));

a propylene.1-butene copolymer (B) containing a unit derived from propylene in an amount of 51 to 95 mol % and a unit derived from 1-butene in an amount of 5 to 49 mol %, wherein the total of the unit derived from propylene and the unit derived from 1-butene is 100 mol % (Component (B));

a copolymer (C) of ethylene and an α-olefin having 3 to 20 carbon atoms (Component (C)); and a copolymer (D) of 1-butene and an α-olefin having 3 carbon atoms or 5 to 20 carbon atoms containing a constitutional unit derived from 1-butene in an amount of 50 to 99 mol % and a constitutional unit derived from an α-olefin having 3 carbon atoms or 5 to 20 carbon atoms in an amount of 1 to 50 mol %, wherein the total of the unit derived from 1-butene and the unit derived from the α-olefin is 100 mol % (Component (D)).

Here, the resin composition constituting the heat sealing layer 10 of the embodiment includes 20 to 95 parts by weight of Component (A), and 5 to 80 parts by weight of two or more kinds of components selected from the group consisting of Component (B), Component (C), and Component (D).

In addition, the total amount of Component (A), Component (B), Component (C), and Component (D) is 100 parts by weight.

Regarding a more preferable content of each of these components, the content of Component (A) is preferably 30 to 90 parts by weight, more preferably 40 to 90 parts by weight, and particularly preferably 50 to 85 parts by weight.

In addition, the content (total content) of two or more kinds of components selected from the group consisting of Component (B), Component (C), and Component (D) is preferably 10 to 70 parts by weight, more preferably 10 to 60 parts by weight, and particularly preferably 15 to 50 parts by weight.

The resin composition constituting the heat sealing layer 10 is preferably a composition including, as required components, Component (A) and Component (B), as described above. Specifically, two or more kinds of copolymers selected from the group consisting of the Component (B), the Component (C), and the Component (D) include Component (B) as a required component and further, the content of the Component (B) is 3 to 25 parts by weight, preferably 4 to 23 parts by weight, and more preferably 5 to 20 parts by weight [wherein the total amount of Component (A), Component (B), Component (C), and Component (D) is 100 parts by weight].

Hereinafter, each component included in the resin composition constituting the heat sealing layer 10 will be described.

[Component (A)]

Component (A) used in the embodiment is a propylene-based polymer having a melting point (Tm) of equal to or higher than 120° C. and equal to or lower than 170° C. as measured by differential scanning calorimetry (DSC). The propylene-based polymer may be a homopropylene, a random copolymer of propylene and an α-olefin having 2 to 20 carbon atoms (excluding propylene), or a propylene block copolymer, and is preferably a homopropylene or a random copolymer of propylene and an α-olefin having 2 to 20 carbon atoms.

In the resin composition constituting the heat sealing layer 10 of the embodiment, from the viewpoint of imparting heat resistance and rigidity to the heat sealing layer 10, it is particularly preferable to use a homopropylene. From the viewpoint of imparting flexibility and transparency to the heat sealing layer 10, it is preferable to use a random copolymer of propylene and an α-olefin having 2 to 20 carbon atoms.

Here, examples of the α-olefin to be copolymerized with propylene include ethylene, 1-butene, 1-pentene, 3-methyl-1-butene, 1-hexene, 4-methyl-1-pentene, 1-octene, 1-decene, 1-dodecene, 1-tetracene, 1-hexadecene, 1-octanedecene, and 1-eicosene.

In addition, as Component (A) used in the embodiment, an isotactic propylene-based polymer can also be preferably used.

The isotactic propylene-based polymer is a propylene-based polymer in which an isotactic pentad fraction measured by a NMR method is equal to or higher than 0.9 and is preferably equal to or higher than 0.95. The isotactic pentad fraction of the isotactic propylene polymer is equal to or higher than 90% and preferably equal to or higher than 95% in terms of percentage.

The isotactic pentad fraction (mmmm fraction) indicates the ratio of presence of isotactic chains in a pentad fraction unit in the molecule chain measured using a $^{13}$C-NMR spectrum, and is the ratio of propylene monomer unit presence in the center of a chain consisting of five propylene monomer units continuously meso-bonded to each other. Specifically, the isotactic pentad fraction (mmmm fraction) is a value calculated as the fraction of mmmm peaks among all absorption peaks in the methyl carbon region measured from a $^{13}$C-NMR spectrum. The isotactic pentad fraction (mmmm fraction) is measured as follows.

The mmmm fraction is obtained from the absorption peaks of Pmmmm (the peak intensity derived from the third methyl group in a moiety in which five propylene units are continuously isotactically bonded) and Pw (the absorption intensity derived from all methyl groups of a propylene unit) in the $^{13}$C-NMR spectrum by the following equation.

$$mmmm\ \text{fraction}=Pmmmm/Pw$$

NMR measurement is performed as follows, for example. That is, 0.35 g of a sample is dissolved in 2.0 mL of hexachlorobutadiene by heating. The solution is filtered through a glass filter (G2) and 0.5 mL of deuterated benzene is added to the filtrate. The mixture is put into an NMR tube having an inner diameter of 10 mm. Then, $^{13}$C-NMR measurement is performed at 120° C. using NMR apparatus JNM GX-500 manufactured by JEOL LTD. The number of integration times is set to be equal to or more than 10,000 times.

In addition, Component (A) obtained in the embodiment has a melting point (Tm) of equal to or higher than 120° C. and equal to or lower than 170° C. and preferably equal to or higher than 125° C. and equal to or lower than 168° C., which is obtained by differential scanning calorimetry (DSC).

When Component (A) having a melting point (Tm) within this range, moldability, heat resistance, and transparency can be imparted to the heat sealing layer 10.

Further, it is preferable that the fusion heat amount (ΔH) obtained at the same time is equal to or more than 50 mJ/mg.

The melting point (Tm) and the fusion heat amount (ΔH) of Component (A) are measured as follows, for example.

That is, a sample of about 5 mg is heated to 200° C. in a nitrogen atmosphere (20 ml/min) using DSCPyrisl or DSC7 manufactured by Perkin Elmar Co., Ltd., held for 10 minutes, and then cooled to 30° C. at 10° C./min. After holding the sample at 30° C. for 5 minutes, the sample is heated to 200° C. at 10° C./min, wherein the melting point is calculated from the top of the crystalline melting peak.

The melt flow rate (MFR; measured at 230° C. and a load of 2.16 kg according to ASTM D1238) of Component (A) is preferably 0.01 to 400 g/10 min, and more preferably 0.1 to 100 g/10 min. When using Component (A) having such a MFR value, the flowability of the resin composition is improved and a relatively large sheet is easily molded.

In the case in which Component (A) is a propylene.α-olefin random copolymer, it is preferable that the α-olefin is selected from ethylene and an α-olefin having 4 to 20 carbon atoms. The amount thereof is preferably 0.1 to 8 mol %, more preferably 0.2 to 7.5 mol %, and even more preferably 0.3 to 7 mol %.

In addition, the molecular weight distribution (Mw/Mn) of Component (A) obtained by gel permeation chromatography (GPC) is preferably equal to or less than 3.0, more preferably 2.0 to 3.0, and even more preferably 2.0 to 2.5.

The molecular weight distribution (Mw/Mn) can be measured by using, for example, a gel permeation chromatograph Alliance GPC-2000, manufactured by Waters Corporation, as follows. Separation columns used are two columns of TSKgel GNH6-HT and two columns of TSKgel GNH6-HTL, each having an inner diameter of 7.5 mm and a length of 300 mm, and the column temperature is set to 140° C. The mobile phase is composed of o-dichlorobenzene (manufactured by Wako Pure Chemical Industries, Ltd.) and 0.025% by weight of BHT (manufactured by Takeda Pharmaceutical Company Limited.) as an antioxidant, and is moved at 1.0 ml/min, and the sample concentration is adjusted to 15 mg/10 mL. The injection amount of the sample is 500 microliters and a differential refractometer is used as a detector. With regard to standard polystyrenes, for those having a molecular weight of Mw<1,000 and Mw>4×10$^6$, those manufactured by Tosoh Corporation are used; and for those having a molecular weight of 1,000≤Mw≤4×10$^6$, those manufactured by Pressure Chemical Company are used.

As Component (A) used in the embodiment, a component having a tensile modulus of elasticity of equal to or more than 500 MPa can be preferably used. The tensile modulus of elasticity is a value measured using JIS No. 3 dumbbell with a span of 30 mm at a tensile rate of 30 mm/min and 23° C. according to JIS K6301.

Component (A) used in the embodiment can be produced by various methods and can be produced by using, for example, a stereoregular catalyst. Specifically, Component (A) can be produced by using a catalyst formed of a solid titanium catalyst component and an organometallic compound catalyst component, and an electron donor as required. Specifically, as solid titanium catalyst component, a solid titanium catalyst component in which titanium trichloride or a titanium trichloride composition is carried by a carrier having a specific surface area of equal to or more than 100 m$^2$/g, or a solid titanium catalyst component including magnesium, halogen, an electron donor, (preferably an aromatic carboxylic acid ester or alkyl group-containing ether), and titanium as required components, in which these required components are carried by a carrier having a specific surface area of equal to or more than 100 m$^2$/g may be used.

In addition, Component (A) can be produced by using a metallocene catalyst.

As the organometallic compound catalyst component, organoaluminum compounds are preferable. Specific examples of the organoaluminum compounds include trialkylaluminum, dialkylaluminum halide, alkylaluminum sesquihalide, and alkylaluminum dihalide. The organoaluminum compound can be appropriately selected according to the kind of the titanium catalyst component to be used.

As the electron donor, an organic compound having a nitrogen atom, a phosphorus atom, a sulfur atom, a silicon atom, a boron atom or the like can be used, and preferable is an ester compound or an ether compound having such an atom.

The catalyst may be activated by a method such as copulverization, and may be a catalyst onto which such an α-olefin as described above has been prepolymerized.

[Component (B)]

Component (B) used in the embodiment is a propylene.1-butene copolymer containing a unit derived from propylene in an amount of 51 to 95 mol % and a unit derived from 1-butene in an amount of 5 to 49 mol % (wherein the total of the unit derived from propylene and the unit derived from 1-butene is 100 mol %). Such a propylene.1-butene copolymer may be appropriately selected from known components according to the application of use and is preferable that the propylene.1-butene copolymer satisfy, for example, the following requirements.

(1) It is preferable that Component (B) contains a constitutional unit derived from propylene in an amount of 60 to 90 mol % and a constitutional unit derived from 1-butene in an amount of 10 to 40 mol %, in which the total of the constitutional unit derived from propylene and the constitutional unit derived from 1-butene is 100 mol %.

A more preferable embodiment is a component that contains a constitutional unit derived from propylene in an amount of 70 to 90 mol % and a constitutional unit derived from 1-butene in an amount of 10 to 30 mol %, in which the total of the constitutional unit derived from propylene and the constitutional unit derived from 1-butene is 100 mol %.

When the amounts are set to be within such ranges, handleability is excellent and heat sealing is easily performed at a relatively low temperature.

(2) It is preferable that Component (B) has a melting point (Tm) of equal to or lower than 110° C. as measured by differential scanning calorimetry (DSC) or does not have a melting point peak as measured by DSC.

More preferably, the melting point (Tm) is 50 to 110° C., more preferably 60 to 100° C., and even more preferably 65 to 90° C. When the temperature is set to be within such a range, heat sealing is easily performed at a relatively low temperature.

The melting point of Component (B) can be measured by the following manner.

That is, using DSC manufactured by Seiko Instruments Inc., a sample of about 5 mg is placed in an aluminum pan for measurement, heated to 200° C. at 100° C./min, and held at 200° C. for 5 minutes. Then, the sample is cooled to −150° C. at 10° C./min and heated to 200° C. at 10° C./min to obtain an endothermic curve. The melting point can be obtained from the endothermic curve.

(3) The molecular weight distribution (Mw/Mn) of Component (B) is obtained by gel permeation chromatography (GPC) and the molecular weight distribution is preferably equal to or less than 3.0, more preferably 2.0 to 3.0, and even more preferably 2.0 to 2.5.

When Mw/Mn is set to be within the above range, the content of low molecular weight can be controlled for Component (B) and thus bleeding from the surface layer of the laminate film hardly occurs and stickiness and blocking of the surface when the laminate film is stored can be suppressed.

The method of measuring Mw/Mn can adopt the same method as the measurement method of Mw/Mn of Component (A).

(4) It is preferable that the melting point (Tm) of Component (B) measured by a differential scanning calorimeter is 50 to 110° C., more preferably 60 to 100° C., and particularly preferably 65 to 90° C., and a relationship between the melting point (Tm) and the 1-butene constitutional unit amount M (mol %) satisfies $$-2.6 M+130 \leq Tm \leq -2.3 M+155.$$

When Tm and M satisfies the above relationship, it is possible to obtain a laminate film excellent in low temperature heat sealing properties, and having high heat sealing strength and hardly suffering from a reduction in sealing strength by aging after stretching.

In addition, the melt flow rate (MFR; measured at 230° C. and a load of 2.16 kg according to ASTM D1238) of Component (B) used in the embodiment is preferably 0.1 to 30 g/10 min, more preferably 0.5 to 20 g/10 min, and particularly preferably 1.0 to 10 g/10 min.

The propylene.1-butene copolymer used in the embodiment can be suitably obtained by copolymerizing propylene and 1-butene under the presence of a catalyst including a metallocene compound and can be preferably produced by the method described in WO2004/087775 or WO01/27124.

It is more preferable that Component (B) used in the embodiment can be desirably obtained by copolymerizing propylene and 1-butene under the presence of a catalyst including a transition metal compound represented by the following Formula (1a). The transition metal compound (1a) is a compound in which a ligand in which a substituted cyclopentadienyl group and a substituted fluorenyl ring are crosslinked with carbon is coordinated with a transition metal atom.

Here, the catalyst including the transition metal compound (1a) is desirably a compound including at least one of (2a) organometallic compounds, (2b) organoaluminum oxy compounds, and (2c) compounds capable of reacting with the transition metal compound (1a) to form an ion pair, together with the transition metal compound (1a).

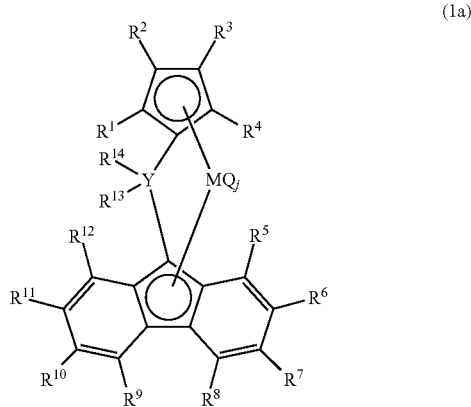

(1a)

In Formula (1a), $R^1$ and $R^3$ each represent hydrogen, and $R^2$ and $R^4$ are each selected from hydrocarbon groups and silicon-containing groups, each of which may be the same or different from each other. $R^5$, $R^6$, $R^7$, $R^8$, $R^9$, $R^{10}$, $R^{11}$, $R^{12}$, $R^{13}$, and $R^{14}$ are selected from hydrogen, hydrocarbon groups and silicon-containing groups and may be the same or different from one another, and adjacent substituents of $R^5$ to $R^{12}$ bonded to carbon may be bonded with each other to form a ring. $R^{13}$ and $R^{14}$ may be the same or different from each other and may be bonded with each other to form a ring. M represents a Group 4 transition metal, Y represents a carbon atom, Q is selected in the same or different combination from halogen, a hydrocarbon group, an anionic ligand, and a neutral ligand which can be coordinated to a lone pair of electrons, and j represents an integer of 1 to 4.

Examples of the hydrocarbon groups include linear hydrocarbon groups such as a methyl group, an ethyl group, an n-propyl group, an allyl group, an n-butyl group, an n-pentyl group, an n-hexyl group, an n-heptyl group, an n-octyl group, an n-nonyl group, and an n-decanyl group; branched hydrocarbon groups such as an isopropyl group, a tert-butyl group, an amyl group, a 3-methylpentyl group, a 1,1-diethylpropyl group, a 1,1-dimethylbutyl group, a 1-methyl-1-propylbutyl group, a 1,1-propylbutyl group, a 1,1-dimethyl-2-methylpropyl group, and a 1-methyl-1-isopropyl-2-methylpropyl group; saturated cyclic hydrocarbon groups such as a cyclopentyl group, a cyclohexyl group, a cycloheptyl group, a cyclooctyl group, a norbornyl group, and an adamantyl group; unsaturated cyclic hydrocarbon groups such as s phenyl group, a tolyl group, a naphthyl group, a biphenyl group, a phenanthryl group, and an anthracenyl group; saturated hydrocarbon groups substituted with unsaturated cyclic hydrocarbon groups, such as a benzyl group, a cumyl group, an 1,1-diphenylethyl group, and an triphenylmethyl group; and heteroatom-containing hydrocarbon groups such as a methoxy group, an ethoxy group, a phenoxy group, a furyl group, an N-methylamino group, an N,N-dimethylamino group, an N-phenylamino group, a pyrryl group, and a thienyl group.

Examples of the silicon-containing groups include a trimethylsilyl group, a triethylsilyl group, a dimethylphenylsilyl group, a diphenylmethylsilyl group, and a triphenylsilyl group.

In addition, adjacent substituents of $R^5$ to $R^{12}$ bonded to carbon may be bonded to each other to form a ring. Examples of such substituted fluorenyl groups include a benzofluorenyl group, a dibenzofluorenyl group, an octahydrodibenzofluorenyl group, an octamethyloctahydrodibenzofluorenyl group, and an octamethyltetrahydrodicyclopentafluorenyl group.

It is preferable that $R^{13}$ and $R^{14}$ are each an aryl group. Examples of the aryl group include the aforementioned cyclic unsaturated hydrocarbon groups, saturated hydrocarbon groups substituted with cyclic unsaturated hydrocarbon groups, and heteroatom-containing cyclic unsaturated hydrocarbon groups such as a furyl group, a pyrryl group, and a thienyl group. In addition, $R^{13}$ and $R^{14}$ are the same or different from each other and may be bonded to each other to form a ring.

In Formula (1a), $R^2$ and $R^4$ which are substituents bonded to a cyclopentadienyl ring are preferably hydrocarbon groups having 1 to 20 carbon atoms. Examples of the hydrocarbon groups having 1 to 20 carbon atoms include the aforementioned hydrocarbon groups. Among these, more preferably, $R^2$ is a bulky substituent such as a tert-butyl group, an adamantyl group or a triphenylmethyl group, and $R^4$ is a substituent sterically smaller than $R^2$ such as a methyl group, an ethyl group or an n-propyl group. As used herein, the expression of "sterically smaller" means the volume which the substituent occupies.

In Formula (1a), among $R^5$ and $R^{12}$ which are substituents bonded to the fluorene ring, arbitrary two or more groups of $R^6$, $R^7$, $R^{10}$, and $R^{11}$ are preferably hydrocarbon groups having 1 to 20 carbon atoms. Examples of the hydrocarbon groups having 1 to 20 carbon atoms include the aforementioned hydrocarbon groups. Particularly, for the purpose of easy synthesis of the ligand, the fluorene ring is preferably symmetrical, that is, $R^6$ and $R^{11}$ are the same groups and $R^7$ and $R^{10}$ are the same groups. In one of such preferable embodiments, $R^6$ and $R^7$ form an aliphatic ring (AR-1) and $R^{10}$ and $R^{11}$ form an aliphatic ring (AR-2) identical to the aliphatic ring (AR-1).

In Formula (1a), Y which crosslinks a cyclopentadienyl ring and a fluorenyl ring is a carbon atom. $R^{13}$ and $R^{14}$ which are substituents bonded to Y are preferably both aryl groups having 6 to 20 carbon atoms. Examples of the aryl groups having 6 to 20 carbon atoms include the aforementioned cyclic unsaturated hydrocarbon groups, saturated hydrocarbon groups substituted with cyclic unsaturated hydrocarbon groups, and heteroatom-containing cyclic unsaturated hydrocarbon groups. In addition, $R^{13}$ and $R^{14}$ may be the same or different from each other and may be bonded to each other to form a ring. Preferable examples of such substituents include a fluorenylidene group, a 10-hydroanthracenylidene group, and a dibenzocycloheptadienylidene group.

In Formula (1a), M is a Group 4 transition metal and specific examples thereof include Ti, Zr, and Hf.

In addition, Q is selected in the same or different combination from halogen, a hydrocarbon group, an anionic ligand, and a neutral ligand which can be coordinated to a lone pair of electrons. j is an integer of 1 to 4. When j is 2 or greater, plural Qs may be the same or different from each other.

Specific examples of the halogen include fluorine, chlorine, bromine and iodine. Specific examples of the hydrocarbon groups are as described above. Specific examples of anionic ligand include alkoxy groups such as methoxy, tert-butoxy, and phenoxy, carboxylate groups such as acetate and benzoate, and sulfonate groups such as mesylate and tosylate. Examples of the neutral ligand capable of coordination through a lone pair of electrons include organophosphorus compounds such as trimethylphosphine, triethylphosphine, triphenylphosphine and diphenylmethylphosphine, and ethers such as tetrahydrofuran, diethyl ether, dioxane and 1,2-dimethoxyethane. It is preferable that at least one Q is halogen or an alkyl group.

Examples of the transition metal compounds (1a) include but are not limited to dimethylmethylene
(3-tert-butyl-5-methylcyclopentadienyl)fluorenylzirconium dichloride, isopropylidene
(3-tert-butyl-5-methylcyclopentadienyl)(2,7-di-tert-butylfluorenyl)zirconium dichloride,
isopropylidene(3-tert-butyl-5-methylcyclopentadienyl) (3, 6-di-tert-butylfluorenyl)zirconium dichloride,
isopropylidene(3-tert-butyl-5-methylcyclopentadienyl)(octamethyl octahydridodibenzofluorenyl)zirconium dichloride,
diphenylmethylene(3-tert-butyl-5-methylcyclopentadienyl) (fluorenyl)zirconium dichloride, diphenylmethylene
(3-tert-butyl-5-methylcyclopentadienyl)(2,7-di-tert-butylfluorenyl)zirconium dichloride,
diphenylmethylene(3-tert-butyl-5-methylcyclopentadienyl) (3,6-di-tert-butylfluorenyl)zirconium dichloride and
diphenylmethylene(3-tert-butyl-5-methylcyclopentadienyl) (octamethyloctahydridodibenzofluorenyl)zirconium dichloride.

The catalysts that are suitably used in the production of Component (B) used in the embodiment preferably includes at least one compound selected from the group consisting of (2a) organometallic compounds, (2b) organoaluminum oxy compounds, and (2c) compounds capable of reacting with the transition metal compound (1a) to form an ion pair, together with the transition metal compound (1a) described above. These compounds (2a), (2b), and (2c) are not particularly limited. Preferable compounds include compounds described in WO2004/087775 and WO01/27124, and the following compounds may be used.

As the organometallic compounds (2a), the following organic compounds of Groups 1, 2, 12, and 13 metals are used.

(2a-1) Organoaluminum compounds represented by the Formula: $R^a{}_m Al(OR^b)_n H_p X_q$
(in the formula, $R^a$ and $R^b$ may be the same or different from each other and each represent a hydrocarbon group having 1 to 15 carbon atoms and preferably 1 to 4 carbon atoms, X represents a halogen atom, m is 0<m≤3, n is 0≤n<3, p is 0≤p<3, q is 0≤q<3, and m+n+p+q=3)

Specific examples of such compounds include trimethylaluminum, triethylaluminum, triisobutylaluminum and diisobutylaluminum hydride.

(2a-2) Alkyl complex compounds of Group 1 metal and aluminum, represented by the Formula: $M^2 AlR^a{}_4$
(In the formula, $M^2$ represents Li, Na or K, $R^a$ represents hydrocarbon group of 1 to 15 carbon atoms and preferably 1 to 4 carbon atoms)

Specific examples of such compounds include LiAl$(C_2H_5)_4$ and LiAl$(C_7H_{15})_4$.

(2a-3) Dialkyl compounds of Group 2 or 12 metal represented by the Formula: $R^a R^b M^3$
(In the formula, $R^a$ and $R^b$ may be the same or different from each other and each represent a hydrocarbon group of 1 to 15 carbon atoms, and preferably 1 to 4 carbon atoms, and $M^3$ represents Mg, Zn or Cd)

Among the above organometallic compounds (2a), the organoaluminum compounds are preferable. The organometallic compounds (2a) may be used alone or two or more kinds thereof may be used in combination.

The organoaluminum oxy-compounds (2b) may be conventionally known aluminoxanes, or benzene-insoluble organoaluminum oxy compounds as disclosed in Japanese Laid-open Patent Publication No. H02-78687.

For example, the conventionally known aluminoxanes can be prepared by the following methods and are usually obtained as a solution in a hydrocarbon solvent.

1) A method in which an organoaluminum compound such as trialkylaluminum is added to a hydrocarbon medium suspension of a compound containing adsorbed water or a salt containing water of crystallization, such as magnesium chloride hydrate, copper sulfate hydrate, aluminum sulfate hydrate, nickel sulfate hydrate or cerous chloride hydrate), to allow the organoaluminum compound to react with the adsorbed water or the water of crystallization.

2) A method in which water, ice or water vapor is allowed to act directly on an organoaluminum compound such as trialkylaluminum in a medium such as benzene, toluene, diethyl ether or tetrahydrofuran.

3) A method in which an organoaluminum compound such as trialkylaluminum is allowed to react with an organotin oxide such as dimethyltin oxide or dibutyltin oxide in a medium such as decane, benzene or toluene.

The aluminoxane may contain small amounts of organometallic components. After the solvent or unreacted organoaluminum compound are distilled away from the recovered solution of the aluminoxane, the aluminoxane obtained may be redissolved in a solvent or suspended in a poor solvent for the aluminoxane. Examples of the organoaluminum compounds used in preparing the aluminoxanes include the organoaluminum compounds mentioned above as the organoaluminum compounds (2a-1). Among those compounds, trialkylaluminum and tricycloalkylaluminum are preferable, and trimethylaluminum is particularly preferable. The organoaluminum compounds may be used alone or two or more kinds thereof may be used in combination.

The benzene-insoluble organoaluminum oxy compounds (2b) usually contain Al components that will dissolve in benzene at 60° C. in an amount of equal to or less than 10 millimols, preferably equal to or less than 5 millimols, and particularly preferably equal to or less than 2 millimols in terms of Al atoms (the amount can be obtained by suspending an organoaluminum oxy compound equivalent to 100 milligrams of Al atoms in 100 ml of benzene, mixing the materials with stirring for 6 hours at 60° C., filtering the mixture at 60° C. by using a G-5 glass filter with jacket, washing the solids remaining on the filter with 50 ml of benzene at 60° C. four times, and then measuring the amount (x %) of the Al atoms (x millimols) which are present in the filtrates). That is, it is preferable that the organoaluminum oxy compounds are insoluble or hardly soluble in benzene. The organoaluminum oxy compounds (2b) may be used alone or two or more kinds thereof may be used in combination.

The compounds (2c) that can react with the transition metal compound (1a) to form an ion pair include Lewis acids, ionic compounds, borane compounds and carborane compounds as disclosed in Japanese Laid-open Patent Publication No. H01-501950, Japanese Laid-open Patent Publication No. H01-502036, Japanese Laid-open Patent Publication No. H03-179005, Japanese Laid-open Patent Publication No. H03-179006, Japanese Laid-open Patent Publication No. H03-207703, Japanese Laid-open Patent Publication No. H03-207704 and U.S. Pat. No. 5,321,106. Further, heteropoly compounds and isopoly compounds can be also used. The compounds (2c) may be used alone or two or more kinds thereof may be used in combination.

In the production of Component (B) used in the embodiment, when the catalyst contains the transition metal compound (1a) and the organoaluminum oxy compound (2b) such as methylaluminoxane, particularly high polymerization activity can be achieved.

In addition, the polymerization catalysts for the production of Component (B) used in the embodiment may contain a carrier or a cocatalyst component as required.

Such catalysts may be prepared by mixing the respective components in advance or after the components are carried by carriers. Alternatively, the respective components may be added to the polymerization system simultaneously or successively.

Component (B) used in the embodiment is obtained suitably by copolymerizing propylene and 1-butene under the presence of the aforementioned catalyst. During the copolymerization, the respective monomers may be used in amounts such that the desired ratio of constitutional units in Component (B) to be produced. Specifically, the monomers are desirably used such that a ratio between propylene and 1-butene molar is 50/50 to 95/5, preferably 60/40 to 90/10, and more preferably 70/30 to 90/10.

The conditions for copolymerization are not particularly limited. For example, the polymerization temperature may be usually in a range of −50 to +200° C., preferably 0 to 170° C., and the polymerization pressure may generally range from normal pressure to 10 MPa gauge pressure, preferably normal pressure to 5 MPa gauge pressure. In addition, the polymerization reaction may be performed batchwise, semi-continuously or continuously. Further, the polymerization may be performed in two or more stages under different reaction conditions.

The molecular weight of Component (B) may be controlled by the presence of hydrogen in the polymerization system or by changing the polymerization temperature. The molecular weight can be also controlled by adjusting the amount of the compound (2a), (2b), or (2c). In the case of in which hydrogen is added, a suitable amount thereof is within a range of about 0.001 to 100 NL per 1 kg of the monomers.

[Component (C)]

Component (C) used in the embodiment is a copolymer of ethylene and an α-olefin having 3 to 20 carbon atoms. The α-olefin can be appropriately selected according to the application of use of the laminate film and a copolymer of ethylene and an α-olefin having 3 to 10 carbon atoms is used.

In addition, as Component (C) used in the embodiment, components having the following properties are preferably used:

(a) the density (measured at 23° C. according to ASTM 1505) is within a range of 0.850 to 0.910 g/cm$^3$, preferably 0.860 to 0.905 g/cm$^3$, and more preferably 0.865 to 0.895 g/cm$^3$; and (b) the melt flow rate (MFR; measured at 190° C. and a load of 2.16 kg according to ASTM D1238) is 0.1 to 150 g/10 min and preferably 0.3 to 100 g/10 min, When Component (C) having such properties is used, heat sealing is easily performed at a relatively low temperature.

The production method of Component (C) is not particularly limited and can be produced by copolymerizing ethylene and the α-olefin with a radical polymerization catalyst, Philips catalyst, Ziegler-Natta catalyst, or a metallocene catalyst.

Among these, when Component (C) is produced using a metallocene catalyst, the copolymer usually has a molecular weight distribution (Mw/Mn) of equal to or less than 3, and thus this case is preferable.

The crystallinity of Component (C) measured by X-ray diffractometry is usually equal to or less than 40%, preferably 0 to 39%, and more preferably 0 to 35%.

Specific examples of the α-olefin having 3 to 20 carbon atoms used in the production of Component (C) include propylene, 1-butene, 1-pentene, 1-hexene, 4-methylpentene, 1-octene, 1-decene, and 1-dodecene. These may be used alone or two or more kinds thereof may be used in combination.

Among these α-olefins, propylene, 1-butene, 1-hexene, and 1-octene are preferable and 1-butene is particularly preferable.

It is preferable that Component (C) contains a constitutional unit derived from ethylene in an amount of 50 to 99 mol % and a constitutional unit derived from an α-olefin having 3 to 20 carbon atoms in an amount of 1 to 50 mol %, and the total of the constitutional unit derived from ethylene and the constitutional unit derived from the α-olefin is 100 mol %.

As a more preferable embodiment, Component (C) contains a constitutional unit derived from ethylene in an amount of 60 to 95 mol % and a constitutional unit derived from an α-olefin having 3 to 20 carbon atoms in an amount of 5 to 40 mol %, and the total of the constitutional unit derived from ethylene and the constitutional unit derived from the α-olefin is 100 mol %.

When the amounts are set to be within the above ranges, heat sealing is easily performed even at a relatively low temperature.

The molecular structure of Component (C) may be linear or branched with long or short side-chains. Further, plural different ethylene.α-olefin random copolymers can be used as a mixture.

Component (C) can be produced by known methods using a vanadium catalyst, a titanium catalyst, a metallocene catalyst, or the like. For example, the component can be produced by the method described in Japanese Patent Laid-Open Publication No. H10-212382. As Component (C), commercially available products may be used.

[Component (D)]

Component (D) used in the embodiment is a copolymer of 1-butene and an α-olefin having 3 carbon atoms or 5 to 20 carbon atoms containing a constitutional unit derived from 1-butene in an amount of 50 to 99 mol % and a constitutional unit derived from an α-olefin having 3 carbon atoms or 5 to 20 carbon atoms in an amount of 1 to 50 mol % (wherein the total of the constitutional unit derived from 1-butene and the constitutional unit derived from the α-olefin is 100 mol %). The α-olefin can be appropriately selected according to the application of use of the laminate film and an α-olefin having 3 to 10 carbon atoms (excluding 1-butene) is preferably used.

Specific examples of the α-olefin that can be used as Component (D) include ethylene, propylene, 1-hexene, 4-methyl-1-pentene, 1-octene, 1-decene and 1-dodecene. Among these, ethylene and propylene are preferable, and propylene is particularly preferable.

It is preferable that Component (D) contains a constitutional unit derived from 1-butene in an amount of 60 to 95 mol % and a constitutional unit derived from an α-olefin having 3 carbon atoms or 5 to 20 carbon atoms in an amount of 5 to 40 mol %, and the total of the constitutional unit derived from 1-butene and the constitutional unit derived from the α-olefin is 100 mol %.

As a more preferable embodiment, Component (D) contains a constitutional unit derived from 1-butene in an amount of 70 to 90 mol % and a constitutional unit derived from an α-olefin having 3 carbon atoms or 5 to 20 carbon atoms in an amount of 10 to 30 mol %, and the total of the constitutional unit derived from ethylene and the constitutional unit derived from the α-olefin is 100 mol %.

When the amounts are set to be within the above ranges, heat sealing is easily performed even at a relatively low temperature.

The melt flow rate (MFR; measured at 230° C. and a load of 2.16 kg according to ASTM D1238) of Component (D) is within a range of 0.1 to 50 g/10 min, preferably 0.2 to 40 g/10 min, and more preferably 0.5 to 25 g/10 min.

Such Component (D) can be produced by polymerization using a known Ziegler-based catalyst or metallocene-based catalyst. Specifically, the component can be produced by polymerization methods using a stereoregular catalyst described in Japanese Examined Patent Application No. S64-7088, Japanese Laid-open Patent Publication No. S59-206415, Japanese Laid-open Patent Publication No. S59-206416, Japanese Laid-open Patent Publication No. H04-218508, and Japanese Laid-open Patent Publication No. H08-225605.

As Component (D), commercially available products may be used.

(Base Layer)

The laminate film 30 according to the embodiment is obtained by laminating the base layer 20 on the aforementioned heat sealing layer 10.

The base material for constituting the base layer 20 may adopt conventionally known materials according to the application of use. Specific examples thereof include thermoplastic resin films such as films composed of polyesters typified by polyethylene terephthalate and polyethylene naphthalate, polycarbonate films, films composed of polyamides such as nylon 6 and nylon 66, ethylene.vinyl alcohol copolymer films, polyvinyl alcohol films, polyvinyl chloride films, polyvinylidene chloride films and films composed of polyolefins such as polypropylene.

In addition, a single layer or two or more layers composed of the base material may be used according to the application of use.

As the thermoplastic resin film, a film obtained by depositing an inorganic substance such as aluminum, zinc, or silica, or an oxide may be used.

(Application)

The laminate film 30 according to the embodiment can be sued to produce a packaging bag by fusing (for example, heat-fusing) the heat sealing layers 10 of the laminate films 30.

The packaging bag obtained by the embodiment includes a heat sealing layer composed of a resin composition including specific Component (A) to Component (D), and although the heat sealing layer is subjected to a corona treatment, even in the case of performing sealing at a known heat sealing temperature, a sufficient strength can be exhibited. Therefore, in the case in which the heat sealing layers are heat-fused, a packaging bag having antifogging properties and excellent in strength can be obtained.

Therefore, it is possible to use the packaging bag as a packaging bag for various hydrous foods typified by meat, processed meat foods such as sausage, fresh vegetables and seafood, and other processed foods.

Needless to say, the application of use of the packaging bag of the embodiment is not limited to food and as long as antifogging properties are required in the application, for example, application of packaging ornamental plants and the like, the packaging bag can be suitably used.

The embodiments of the present invention have been described above but these are merely examples of the present invention. Various configurations other than the above embodiments can be adopted.

EXAMPLES

Next, the laminate film of the present invention and the packaging bag obtained from the laminate film will be described in more detail with reference to examples but the present invention is not limited to these examples.

The methods of measuring each physical property of Component (A), Component (B), Component (C), and Component (D) are as follows.

[Molecular Weight Distribution (Mw/Mn)]

The molecular weight distribution (Mw/Mn) was measured by using a gel permeation chromatograph Alliance GPC-2000, manufactured by Waters Corporation as follows. Separation column used were two columns of TSKgel GNH6-HT and two columns of TSKgel GNH6-HTL, each having an inner diameter of 7.5 mm and a length of 300 mm, and the column temperature was set to 140° C. The mobile phase was composed of o-dichlorobenzene (manufactured by Wako Pure Chemical Industries, Ltd.) and 0.025% by weight of BHT (manufactured by Takeda Pharmaceutical Company Limited.) as an antioxidant, and was moved at 1.0 ml/min, and the sample concentration was adjusted to 15 mg/10 mL. The injection amount of the sample was 500 microliters and a differential refractometer was used as a detector. With regard to standard polystyrenes, for those having a molecular weight of Mw<1,000 and Mw>4×$10^6$, those manufactured by Tosoh Corporation were used; and for those having a molecular weight of 1,000≤Mw≤4×$10^6$, those manufactured by Pressure Chemical Company were used.

[Content of Ethylene, Propylene, and α-Olefin in Polymer]

The contents of ethylene, propylene, and α-olefin were determined using a JNM GX-500 Model NMR measuring apparatus manufactured by JEOL LTD. as follows. 0.35 g of a sample was dissolved in 2.0 ml of hexachlorobutadiene by heating. The solution was filtered through a glass filter (G2), 0.5 ml of deuterated benzene was then added thereto, and the mixture was put into an NMR tube having an inner diameter of 10 mm. The $^{13}$C-NMR was measured at 120° C. The number of integration times was set to be equal to or more than 10,000 times. The composition of ethylene, propylene, and α-olefin was determined from the obtained $^{13}$C-NMR spectrum.

[Melting Point (Tm) of Component (A)]

A sample of about 5 mg was heated to 200° C. in a nitrogen atmosphere (20 ml/min) using DSCPyrisl or DSC7 manufactured by Perkin Elmar Co., Ltd., held for 10 minutes, and then cooled to 30° C. at 10° C./min. After holding the sample at 30° C. for 5 minutes, the sample was heated to 200° C. at 10° C./min, wherein the melting point was calculated from the top of the crystalline melting peak.

[Melting Point (Tm) Component (B), Component (C), and Component (D)]

Using DSC manufactured by Seiko Instruments Inc., a sample of about 5 mg was placed in an aluminum pan for measurement, heated to 200° C. at 100° C./min, and held at 200° C. for 5 minutes. Then, the sample was cooled to −150° C. at 10° C./min and heated to 200° C. at 10° C./min to obtain an endothermic curve.

[Melt Flow Rate (MFR) of Component (A), Component (B), Component (C), and Component (D)]

The melt flow rate (MFR) of Component (A), Component (B), and Component (D) was measured at 230° C. and a load of 2.16 kg according to ASTM D1238.

In addition, the melt flow rate (MFR) of Component (C) was measured at 190° C. and a load of 2.16 kg according to ASTM D1238.

[Heat Sealing Strength]

The films which had been subjected to a corona treatment, which will be described later, were superposed in such a manner that the corona-treated surfaces thereof were superposed, and the both surfaces of the superposed films were sandwiched by a Teflon (registered trademark) sheet having a thickness of 50 μm to form a test piece. Next, heat seal bars of a heat seal tester (TB-701B manufactured by TESTER SANGYO CO., LTD.) were installed so as to be 5 mm in width 5 mm×300 mm in length and the temperature of the lower seal bar was set to 70° C. The test piece (Teflon (registered trademark) sheet/film/film/Teflon (registered trademark) sheet), which was held by the heat seal bars, was heat-sealed at a pressure of 0.2 MPa for 1.0 second. After the Teflon (registered trademark) sheet was detached, the heat-sealed part of the composite films was allowed to stand under a room temperature of about 23° C. for 2 days. The films including their heat-sealed parts were slit, the slit part measuring 15 mm in width, while the non-sealed parts were chucked to a tensile tester ("IM-20ST manufactured by "INTESCO"). At a rate of 300 mm/min, the 180° peeling strength between the films was measured. The above operation was performed five times, and an average value thereof was defined as heat sealing strength.

Next, a synthesis example of a metallocene complex which is a constitutional component of an olefin polymerization catalyst, and a preparation example of a propylene.1-butene copolymer which is Component (B) using the metallocene complex will be described.

[Synthesis Example]—Synthesis of Metallocene Complex (1) Preparation of 1-tert-butyl-3-methylcyclopentadiene In a nitrogen atmosphere, a solution of 3-methylcyclopentenone (43.7 g, 0.45 mmol) in dried diethyl ether (150 ml) was added dropwise to a solution obtained by adding dried diethyl ether (350 ml) to a tert-butylmagnesium chloride/diethyl ether solution (450 ml, 0.90 mol, a 2.0 mol/L solution), while keeping the temperature at 0° C. by ice cooling. The mixture was further stirred at room temperature for 15 hours. To the reaction solution, a solution of ammonium chloride (80.0 g, 1.50 mol) in water (350 ml) was added dropwise while keeping the temperature at 0° C. by ice cooling. Water (2,500 ml) was added to the resultant solution, and the mixture was stirred. The organic phase was separated and washed with water. A 10% aqueous hydrochloric acid solution (82 ml) was added to the organic phase while keeping the temperature at 0° C. by ice cooling. The mixture was stirred at room temperature for 6 hours. The organic phase of the resultant reaction liquid was separated, then washed with water, a saturated aqueous sodium hydrogen carbonate solution, water and a saturated saline solution, and then dried over anhydrous magnesium sulfate. The desiccant was filtered, and the solvent was distilled away from the filtrate, resulting in a liquid. The liquid was distilled under reduced pressure (45 to 47° C./10 mm Hg) to obtain 14.6 g of a light yellow liquid. The analytical data are shown below.

$^1$H-NMR (270 MHz, in CDCl$_3$, TMS standard) δ6.31+6.13+5.94+5.87 (s+s+t+d, 2H), 3.04+2.95 (s+s, 2H), 2.17+2.09 (s+s, 3H), 1.27 (d, 9H)

(2) Preparation of 3-tert-butyl-1,6,6-trimethylfulvene

In a nitrogen atmosphere, dried acetone (55.2 g, 950.4 mmol) was added dropwise to a solution of 1-tert-butyl-3-methylcyclopentadiene (13.0 g, 95.6 mmol) obtained by the above method (1) in dried methanol (130 ml), while keeping the temperature at 0° C. by ice cooling, and subsequently pyrrolidine (68.0 g, 956.1 mmol) was added thereto dropwise. The mixture was stirred at room temperature for 4 days. The resultant reaction liquid was diluted with diethyl ether (400 ml), and water (400 ml) was added. The organic phase was separated, then washed with a 0.5 N aqueous hydrochloric acid solution (150 ml×4), water (200 ml×3) and a saturated saline solution (150 ml), and dried over anhydrous magnesium sulfate. The desiccant was filtered, and the solvent was distilled away from the filtrate, resulting in a liquid. The liquid was distilled under reduced pressure (70 to 80° C./0.1 mm Hg) to obtain 10.5 g of a yellow liquid. The analytical data are shown below.

$^1$H-NMR (270 MHz, in CDCl$_3$, TMS standard) δ6.23 (s, 1H), 6.05 (d, 1H), 2.23 (s, 3H), 2.17 (d, 6H), 1.17 (s, 9H)

(3) Preparation of 2-(3-tert-butyl-5-methyl cyclopentadienyl)-2-fluorenylpropane In a nitrogen atmosphere, a hexane solution of n-butyllithium (40 ml, 61.6 mmol) was added dropwise to a solution of fluorene (10.1 g, 60.8 mmol) obtained by the above method (2) in THF (300 ml) with ice cooling. The mixture was stirred at room temperature for 5 hours (resulting in a dark brown solution). The solution was ice cooled again, and a solution of 3-tert-butyl-1,6,6-trimethylfulvene (11.7 g, 66.5 mmol) in THF (300 ml) was added thereto dropwise in a nitrogen atmosphere. The reaction solution was stirred at room temperature for 14 hours. The resultant brown solution was ice cooled, and water (200 ml) was added. The obtained solution was extracted with diethyl ether. Then the organic phase was separated therefrom, and dried over magnesium sulfate. The organic phase was filtered, and the solvent was removed from the filtrate under reduced pressure, resulting in an orange brown oil. The oil was purified by silica gel column chromatography (developing solvent: hexane) to obtain 3.8 g of a yellow oil. The analytical data are shown below.

$^1$H-NMR (270 MHz, in CDCl$_3$, TMS standard) δ7.70 (d, 4H), 7.34-7.26 (m, 6H), 7.18-7.11 (m, 6H), 6.17 (s, 1H), 6.01 (s, 1H), 4.42 (s, 1H), 4.27 (s, 1H), 3.01 (s, 2H), 2.87 (s, 2H), 2.17 (s, 3H), 1.99 (s, 3H), 2.10 (s, 9H), 1.99 (s, 9H), 1.10 (s, 6H), 1.07 (s, 6H).

(4) Preparation of dimethylmethylene(3-tert-butyl-5-methylcyclopentadienyl)fluorenylzirconium dichloride In a nitrogen atmosphere, a hexane solution of n-butyllithium (5.0 ml, 7.7 mmol) was added dropwise to a solution of 2-(3-tert-butyl-5-methylcyclopentadienyl)-2-fluorenylpropane (1.14 g, 3.3 mmol) obtained by the above method (3) in diethyl ether (25 ml) in ice cooling. The mixture was stirred at room temperature for 14 hours to give a pink slurry. Zirconium tetrachloride (0.77 g, 3.3 mmol) was added to the slurry at −78° C. The mixture was stirred at −78° C. for several hours and at room temperature for 65 hours. The resultant dark brown slurry was filtered. The residue was washed with 10 ml of diethyl ether, and then was extracted with dichloromethane to obtain a red solution. The solvent of the solution was distilled away under reduced pressure to obtain 0.53 g of red orange solid metallocene catalyst dimethylmethylene(3-tert-butyl-5-methylcyclopentadienyl)fluorenylzirconium dichloride. The analytical data are shown below.

$^1$H-NMR (270 MHz, in CDCl$_3$, TMS standard) δ8.11-8.02 (m, 3H), 7.82 (d, 1H), 7.56-7.45 (m, 2H), 7.23-7.17 (m, 2H), 6.08 (d, 1H), 5.72 (d, 1H), 2.59 (s, 3H), 2.41 (s, 3H), 2.30 (s, 3H), 1.08 (s, 9H).

[Preparation Example]—Propylene.1-Butene Copolymer (B)

A 2,000 ml polymerizer that had been thoroughly purged with nitrogen was charged with nitrogen was charged with 875 ml of dried hexane, 75 g of 1-butene, and triisobutylaluminum (1.0 mmol) at normal temperature. The temperature inside the polymerizer was increased to 65° C., and the polymerizer was pressurized to 0.7 MPa with propylene. Subsequently, a toluene solution in which 0.002 mmol of dimethylmethylene (3-tert-butyl-5-methylcyclopentadienyl)fluorenylzirconium dichloride as the metallocene catalyst which had been obtained in the above Synthesis example, 0.6 mmol of methylaluminoxane (manufactured by Tosoh Finechem Corporation) in terms of aluminum were in contact with each other was added in the polymerizer. Polymerization was performed for 30 minutes while keeping the internal temperature of the polymerizer at 65° C. and the propylene pressure at 0.7 MPa, and was terminated by the addition of 20 ml of methanol. The polymerizer was depressurized, and then the polymer was precipitated by adding the polymerization solution to 2 L of methanol and was dried under vacuum at 130° C. for 12 hours.

The polymer thus obtained weighed 15.2 g. The polymer had a content of 1-butene (M) of 19.4 mol %, a melt flow rate (MFR) of 6.5 g/10 min, a molecular weight distribution (Mw/Mn) of 2.11, and a melting point (Tm) of 75.3° C. In the following description, the polymer is abbreviated as PBR in some cases.

Example 1

(Production of Unstretched Laminate Film 1)

Two extruders connected to a T-die was used and the resin composition for a heat sealing layer and the resin composition for a base layer shown below were supplied to the respective extruders, and the temperature of the die and resin composition was set to 230° C. The amount of extrusion of each extruder was set such that a ratio between the thickness of the heat sealing layer and the thickness of the base layer became 2/23, and an unstretched laminate film 1 having a thickness of 1,000 μm was obtained by coextrusion molding.

The resin composition for a heat sealing layer was obtained by blending as component (A), Adsyl5C30F (manufactured by LyondellBasell Industries) as a propylene random copolymer having a MFR of 5.5 g/10 min, and a melting point of 138° C., the propylene.1-butene copolymer (B) obtained in the above preparation example, and as Component (C), an ethylene.1-butene copolymer (manufactured by Mitsui Chemicals, Inc. ethylene content: 90 mol %, α-olefin content: 10 mol %, MFR 3.6 g/10 min, density: 870 kg/m$^3$) at a weight ratio of 85/7.5/7.5. In the following description, Adsyl5C30F (manufactured by LyondellBasell Industries) is simply abbreviated as PP, and ethylene.1-butene copolymer is simply abbreviated as EBR in some cases.

The resin composition or a base layer was Prime Polypro F113G (manufactured by Prime Polymer Co., Ltd.).

(Production of Stretched Laminate Film 1)

The above unstretched laminate film 1 was biaxially stretched by a batch type biaxial stretching machine at a stretching temperature of 158° C. and a stretching rate of 238% such that vertical×horizontal=5 times×8 times (stress relaxation after stretching for 30 seconds) to obtain a stretched laminate film 1 (the thickness of the base layer: 23 μm, the thickness of the heat sealing layer: 2 μm).

Next, using a moving table type corona treatment apparatus, manufactured by Kasuga electric works Ltd., (effective treatment width=430 mm, electrode=wire electrode used, treatment rate=10 cm/sec (6 m/min), one-way corona treatment, discharge output: 2.15 A), the surface of the film on the side close to the heat sealing layer was subjected to a corona treatment.

(Measurement of Heat Sealing Strength)

Next, the stretched laminate films 1 were superposed in such a manner that the corona-treated heat sealing layers were superposed and the both surfaces of the superposed films were sandwiched by a Teflon (registered trademark) sheet having a thickness of 50 μm to prepare a test piece. According to the aforementioned method of measuring heat sealing strength, the 180° peeling strength between the films was measured at a rate of 300 mm/min. Each physical property will be shown in Table 1.

(Measurement of Wet Tension)

According to ASTM-D-2578-67T, the wet tension was measured in the atmosphere of 23° C. and 65% RH. The measurement was repeated five times by replacing the test piece, and an average value thereof was calculated. The measurement value after 5 to 6 hours had passes from the corona treatment and the measurement value after 3 days had passed form the corona treatment were collected.

(Evaluation of Antifogging Properties)

100 ml of water was poured into a 300 ml beaker and the temperature was adjusted to 30° C. by a heat stirrer. Then, the laminate film was attached to the beaker such that the surface on the side close to the heat sealing layer and the contents in the beaker faced to each other and sealed with a rubber band. The sealed beaker was allowed to stand in an environment of 10° C. and 50% RH for 20 minutes and the attachment of water drops was evaluated in two stages. The evaluation result was A.

A: The inner surface of the film was evenly wet and water drops were not observed and the inner surface was less evenly wet but the opposite side was clearly seen.

B: The opposite side was not clearly viewed in some portions due to water drops and the opposite side was not completely seen due to a large number of fine water drops.

Generally, when the film exhibits a wet tension of about 35 to 40 mN/m, the result that the film does not have antifogging properties is obtained in the evaluation.

Example 2

A film was prepared in the same manner as in Example 1 except that instead of using the blend including Component (A), Component (B), and Component (C) at a weight ratio of 85/7.5/7.5, a blend including Component (A), Component (B), and Component (C) at weight ratio of 85/4/11 was used, and evaluation of heat sealing strength, measurement of wet tension, and evaluation of antifogging properties were performed. The results are shown in Table 1.

Comparative Example 1

A film was prepared in the same manner as in Example 1 except that instead of using the blend including Component (A), Component (B), and Component (C) at a weight ratio of 85/7.5/7.5, a blend including Component (A) and Component (B) at a weight ratio of 85/15, and evaluation of heat sealing strength, measurement of wet tension, and evaluation of antifogging properties were performed. The results are shown in Table 1.

Comparative Example 2

A film was prepared in the same manner as in Example 1 except that instead of using the blend including Component (A), Component (B), and Component (C) at a weight ratio of 85/7.5/7.5, a blend including Component (A) and Component (C) at a weight ratio of 85/15, and evaluation of heat sealing strength, measurement of wet tension, and evaluation of antifogging properties were performed. The results are shown in Table 1.

Comparative Example 3

A film was prepared in the same manner as in Example 1 except that instead of using the blend including Component (A), Component (B), and Component (C) at a weight ratio of 85/7.5/7.5, only Component (A) was used, and evaluation of heat sealing strength, measurement of wet tension, and evaluation of antifogging properties were performed. The results are shown in Table 1.

Reference Example 1

Evaluation of heat sealing strength was performed in Example 1 without a corona treatment. The result is shown in Table 1. When the antifogging properties were measured as in Example 1, the attachment of a large number of fine water drops to the film on the side close to the heat sealing layer was recognized and it was determined that antifogging properties was not sufficient (in Table 1, expressed as "B").

Reference Example 2

Evaluation of heat sealing strength and evaluation of antifogging properties were performed in Example 2 without a corona treatment. The result is shown in Table 1.

Reference Example 3

Evaluation of heat sealing strength and evaluation of antifogging properties were performed in Comparative Example 1 without a corona treatment. The results are shown in Table 1.

Reference Example 4

Evaluation of heat sealing strength and evaluation of antifogging properties were performed in Comparative Example 2 without a corona treatment. The results are shown in Table 1.

Reference Example 5

Evaluation of heat sealing strength and evaluation of antifogging properties were performed in Comparative Example 3 without a corona treatment. The results are shown in Table 1.

TABLE 1

| | | Example 1 | Example 2 | Comparative Example 1 | Comparative Example 2 | Comparative Example 3 | Reference Example 1 | Reference Example 2 | Reference Example 3 | Reference Example 4 | Reference Example 5 |
|---|---|---|---|---|---|---|---|---|---|---|---|
| Corona treatment (discharge output = 2.15 A, mobility = 6 m/min) | | Treated | Treated | Treated | Treated | Treated | Not treated | Not treated | Not treated | Not treated | Not treated |
| Composition of heat sealing layer (parts by weight) | (A) PP | 85 | 85 | 85 | 85 | 100 | 85 | 85 | 85 | 85 | 100 |
| | (B) PBR | 7.5 | 4 | 15 | 0 | 0 | 7.5 | 4 | 15 | 0 | 0 |
| | (C) EBR | 7.5 | 11 | 0 | 15 | 0 | 7.5 | 11 | 0 | 15 | 0 |
| Heat sealing strength (N/15 mm) | 70° C. | 0.1 | 0.1 | 0 | 0 | 0 | 0.1 | 0 | 0.1 | 0 | 0 |
| | 80° C. | 0.1 | 0.1 | 0 | 0.1 | 0 | 0.1 | 0.1 | 0.8 | 0.1 | 0.1 |
| | 90° C. | 0.2 | 0.1 | 0.1 | 0.1 | 0.1 | 1.9 | 1.0 | 3.1 | 0.1 | 0.1 |
| | 100° C. | 0.5 | 0.2 | 0.1 | 0.2 | 0.1 | 3.9 | 1.7 | 3.0 | 0.1 | 0.1 |
| | 110° C. | 1.1 | 0.8 | 0.2 | 0.6 | 0.2 | 2.8 | 3.1 | 2.6 | 2.0 | 0.2 |
| | 120° C. | 3.1 | 2.2 | 1.9 | 1.8 | 1.6 | 3.8 | 3.8 | 2.8 | 3.5 | 3.6 |
| | 130° C. | 3.6 | 3.5 | 3.5 | 3.3 | 2.4 | 4.1 | 3.4 | 3.8 | 4.1 | 3.0 |

TABLE 1-continued

| | | Example 1 | Example 2 | Comparative Example 1 | Comparative Example 2 | Comparative Example 3 | Reference Example 1 | Reference Example 2 | Reference Example 3 | Reference Example 4 | Reference Example 5 |
|---|---|---|---|---|---|---|---|---|---|---|---|
| | 140° C. | 3.1 | 3.3 | 3.2 | 3.8 | 3.2 | 3.2 | 3.7 | 3.0 | 4.1 | 2.8 |
| | 150° C. | 3.2 | 3.4 | 3.5 | 3.4 | 3.0 | 3.4 | 3.5 | 3.3 | 4.4 | 3.8 |
| Wet tension (mN/M) | 5 to 6 hr | 39 | 39 | 38 | 39 | 40 | 28 | 28 | 28 | 28 | 28 |
| | 3 days | 38 | 38 | 37 | 38 | 37 | — | — | — | — | — |
| Evaluation of antifogging properties | | A | A | A | A | A | B | B | B | B | B |

In Table, the symbol "—" indicates unmeasured.

Example 3

(Production of Unstretched Laminate Film 2)

An unstretched laminate film 2 was produced in the same manner as in the production of the unstretched laminate film 1 except that as the resin composition for a heat sealing layer, a resin composition obtained by blending, as Component (A), Adsyl5C30F (manufactured by LyondellBasell Industries) as a propylene random copolymer having a MFR of 5.5 g/10 min and a melting point of 138° C., as Component (B), the propylene.1-butene copolymer (B) obtained in the above preparation example, and as Component (D), a 1-butene.propylene copolymer (manufactured by Mitsui Chemicals, Inc. 1-butene content: 76 mol %, propylene content: 24 mol %, MFR 9.0 g/10 min, density: 885 kg/m$^3$) at a weight ratio of 70/15/15 was used. In the following description, the 1-butene.propylene copolymer is simply abbreviated as BPR in some cases.

(Production of Stretched Laminate Film 2)

The above unstretched laminate film 2 was biaxially stretched by a batch type biaxial stretching machine at a stretching temperature of 158° C. and a stretching rate of 238% such that vertical×horizontal=5 times×8 times (stress relaxation after stretching for 30 seconds) to obtain a stretched laminate film 2 (the thickness of the base layer: 23 μm, the thickness of the heat sealing layer: 2 μm).

Next, using a moving table type corona treatment apparatus, manufactured by Kasuga electric works Ltd., (effective treatment width=430 mm, electrode=wire electrode used, treatment rate=6.7 cm/sec (4 m/min), one-way corona treatment, discharge output: 1.95 A), the surface of the film on the side close to the heat sealing layer was subjected to a corona treatment.

(Measurement of Heat Sealing Strength, Measurement of Wet Tension, and Evaluation of Antifogging Properties)

Next, the stretched laminate films 2 were superposed in such a manner that the corona-treated heat sealing layers were superposed and the both surfaces of the superposed films were sandwiched by a Teflon (registered trademark) sheet having a thickness of 50 μm to prepare a test piece. Measurement of heat sealing strength and evaluation of antifogging properties were performed by the exactly same method described in Example 1. The results are shown in table 2.

Incidentally, regarding the unstretched laminate film of Example 3, and the following Comparative Examples 4 and 5, and Reference Examples 5 to 8, the wet tension was measured in an environment of 23° C. and 65% RH according to ASTM-D-2578-67T. The measurement was repeated five times by replacing the test piece, and an average value thereof was calculated. The measurement value after 5 to 6 hours had passes from the corona treatment and the measurement value after 3 days had passed form the corona treatment were collected.

Comparative Example 4

A film was prepared in the same manner as in Example 3 except that instead of using the blend including Component (A), Component (B), and Component (D) at a weight ratio of 70/15/15, a blend including Component (A) and Component (B) at a weight ratio of 70/30 was used, and evaluation of heat sealing strength, measurement of wet tension, and evaluation of antifogging properties were performed. The results are shown in Table 2.

Comparative Example 5

A film was prepared in the same manner as in Example 3 except that instead of using the blend including Component (A), Component (B), and Component (D) at a weight ratio of 70/15/15, only Component (A) was used, and evaluation of heat sealing strength, measurement of wet tension, and evaluation of antifogging properties were performed. The results are shown in Table 2.

Reference Example 6

Evaluation of heat sealing strength and measurement of wet tension were performed in Example 3 without a corona treatment. The results are shown in Table 2. When the antifogging properties were measured as in Example 3, the attachment of a large number of fine water drops to the film on the side close to the heat sealing layer was recognized and it was determined that antifogging properties was not sufficient (in Table 2, expressed as "B").

Reference Example 7

Evaluation of heat sealing strength, measurement of wet tension, and evaluation of antifogging properties were performed in Comparative Example 4 without a corona treatment. The results are shown in Table 2.

Reference Example 8

Evaluation of heat sealing strength, measurement of wet tension, and evaluation of antifogging properties were performed in Comparative Example 5 without a corona treatment. The results are shown in Table 2.

TABLE 2

|  |  | Example 3 | Comparative Example 4 | Comparative Example 5 | Reference Example 6 | Reference Example 7 | Reference Example 8 |
|---|---|---|---|---|---|---|---|
| Corona treatment (discharge output = 1.95 A, mobility = 4 m/min) | | Treated | Treated | Treated | Not treated | Not treated | Not treated |
| Composition of heat sealing layer (parts by weight) | (A) PP | 70 | 70 | 100 | 70 | 70 | 100 |
| | (B) PBR | 15 | 30 | 0 | 15 | 30 | 0 |
| | (C) EBR | 15 | 0 | 0 | 15 | 0 | 0 |
| Heat sealing strength (N/15 mm) | 70° C. | 0 | 0 | 0 | 3.7 | 2.9 | 0.1 |
| | 80° C. | 0.5 | 0 | 0 | 3.6 | 3.9 | 0.1 |
| | 90° C. | 0.5 | 0.1 | 0 | 3.7 | 4.2 | 0.1 |
| | 100° C. | 3.5 | 0.1 | 0.1 | 3.8 | 4.2 | 0.1 |
| | 110° C. | 4.3 | 0.2 | 0.1 | 3.5 | 4.3 | 0.4 |
| | 120° C. | 3.2 | 1.9 | 0.5 | 3.7 | 4.4 | 3.8 |
| | 130° C. | 3.8 | 3.5 | 3.4 | 3.8 | 3.8 | 3.7 |
| | 140° C. | 3.6 | 3.2 | 3.9 | 3.7 | 3.8 | 3.8 |
| Wet tension (mN/m) | 5 to 6 hr | 39 | 38 | 40 | 28 | 28 | 28 |
| Evaluation of antifogging properties | | A | A | A | B | B | B |

As easily understood from the results of Examples, Comparative Examples, and Reference Examples above, for example, at a heat sealing temperature of 120° C. which is industrially most frequently adopted, in the heat sealing layers composed of a known single polypropylene, or a blend of two components of polypropylene/propylene.1-butene copolymer, the heat sealing strength is decreased by about 2.0 N and 0.9 N each (for example, comparisons of Reference Example 5 and Comparative Example 3, and Reference Example 3 and Comparative Example 1, and the like) by a corona treatment for improving visibility of contents in a packaging bag (=exhibit antifogging properties) are recognized, and in the case of using a heat sealing layer composed of a blend of three components of polypropylene/propylene.1-butene copolymer/ethylene.α-olefin copolymer, the decrease width is controlled to be 0.7 N, and a heat sealing strength thereof of more than 3 N is exhibited (for example, comparison of Reference Example 1 and Example 1).

Similarly, when the heat sealing layer composed of a polypropylene, a propylene.1-butene copolymer, and a 1-butene.propylene copolymer is subjected to a corona treatment, the effect of suppressing a decrease in heat sealing strength is exhibited (refer to Table 2).

The laminate film of the present invention is excellent in antifogging properties and exhibits sufficient strength at a known heat sealing temperature during heat sealing. Therefore, the film can be used for various applications including a packaging bag for hydrous foods.

The present application is a U.S. national stage application of International Patent Application No. PCT/JP2015/073509 filed on Aug. 21, 2015, which claims priority to Japanese Patent Application No. 2014-169835 filed on Aug. 22, 2014, the contents of which are incorporated herein by reference.

The invention claimed is:

1. A laminate film comprising:
a heat sealing layer composed of a resin composition including,
with respect to 20 to 95 parts by weight of a propylene-based polymer (A) having a melting point (Tm) of equal to or higher than 120° C. and equal to or lower than 170° C. as measured by differential scanning calorimetry (DSC),
a total of 5 to 80 parts by weight of two or more kinds of copolymers selected from the group consisting of
a propylene 1-butene copolymer (B) containing a unit derived from propylene in an amount of 51 to 95 mol % and a unit derived from 1-butene in an amount of 5 to 49 mol %, wherein the total of the unit derived from propylene and the unit derived from 1-butene is 100 mol %,
a copolymer (C) of ethylene and an α-olefin having 3 to 20 carbon atoms, and
a copolymer (D) of 1-butene and an α-olefin having 3 carbon atoms or 5 to 20 carbon atoms containing a constitutional unit derived from 1-butene in an amount of 50 to 99 mol % and a constitutional unit derived from an α-olefin having 3 carbon atoms or 5 to 20 carbon atoms in an amount of 1 to 50 mol %, wherein the total of the unit derived from 1-butene and the unit derived from the α-olefin is 100 mol %,
wherein each of Component (B), Component (C), and Component (D) does not correspond to Component (A), and the total amount of Component (A), Component (B), Component (C), and Component (D) is 100 parts by weight; and
a base layer,
wherein a surface of the heat sealing layer opposite to the base layer is modified to have a wet tension of 32 to 45 mN/m.

2. The laminate film according to claim 1,
wherein the surface of the heat sealing layer is modified by a corona treatment.

3. The laminate film according to claim 1,
wherein two or more kinds of copolymers selected from the group consisting of the Component (B), the Component (C), and the Component (D) include the Component (B) as a required component, and the content of the Component (B) is 3 to 25 parts by weight, wherein the total amount of Component (A), Component (B), Component (C), and Component (D) is 100 parts by weight.

4. The laminate film according to claim 1,
wherein the copolymer (C) of ethylene and an α-olefin having 3 to 20 carbon atoms contains a constitutional unit derived from ethylene in an amount of 50 to 99 mol % and a constitutional unit derived from an α-olefin having 3 to 20 carbon atoms in an amount of 1 to 50 mol %, wherein the total of the unit derived from ethylene and the unit derived from the α-olefin is 100 mol %.

5. The laminate film according to claim 1 which is not stretched.

6. The laminate film according to claim 1 which is biaxially stretched.

7. A packaging bag which is formed by fusing the heat sealing layers of the laminate films according to claim 1.

8. A laminate film comprising:
a heat sealing layer composed of a resin composition including,
with respect to 20 to 95 parts by weight of a propylene-based polymer (A) having a melting point (Tm) of equal to or higher than 120° C. and equal to or lower than 170° C. as measured by differential scanning calorimetry (DSC),
a total of 5 to 80 parts by weight of two or more kinds of copolymers selected from the group consisting of
a propylene 1-butene copolymer (B) containing a unit derived from propylene in an amount of 51 to 95 mol % and a unit derived from 1-butene in an amount of 5 to 49 mol %, wherein the total of the unit derived from propylene and the unit derived from 1-butene is 100 mol %,
a copolymer (C) of ethylene and an α-olefin having 3 to 20 carbon atoms, and
a copolymer (D) of 1-butene and an α-olefin having 3 carbon atoms or 5 to 20 carbon atoms containing a constitutional unit derived from 1-butene in an amount of 50 to 99 mol % and a constitutional unit derived from α-olefin having 3 carbon atoms or 5 to 20 carbon atoms in an amount of 1 to 50 mol %, wherein the total of the unit derived from 1-butene and the unit derived from the α-olefin is 100 mol %,
wherein each of Component (B), Component (C), and Component (D) does not correspond to Component (A), and the total amount of Component (A), Component (B), Component (C), and Component (D) is 100 parts by weight; and
a base layer,
wherein the heat sealing layer included in the laminate film is subjected to a modification treatment.

9. The laminate film according to claim 8, wherein the surface of the heat sealing layer opposite to the base layer has a wet tension of 5 to 30 mN/m.

* * * * *